(12) United States Patent
Mueller et al.

(10) Patent No.: US 6,557,408 B1
(45) Date of Patent: May 6, 2003

(54) DEVICE FOR MEASURING THE MASS OF A FLOWING MEDIUM

(75) Inventors: Wolfgang Mueller, Rutesheim (DE); Dieter Tank, Kornwestheim (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,134
(22) PCT Filed: Jun. 7, 2000
(86) PCT No.: PCT/DE00/01850
§ 371 (c)(1), (2), (4) Date: May 11, 2001
(87) PCT Pub. No.: WO00/79222
PCT Pub. Date: Dec. 28, 2000

(30) Foreign Application Priority Data

Jun. 18, 1999 (DE) .......................... 199 27 818

(51) Int. Cl.$^7$ ................................. G01F 5/00
(52) U.S. Cl. ..................................... 73/202.5
(58) Field of Search .............. 73/202.5, 202, 73/204.26, 204.22, 204.21, 118.2

(56) References Cited

U.S. PATENT DOCUMENTS

| | | | | |
|---|---|---|---|---|
| 5,086,650 A | * | 2/1992 | Harrington et al. ....... | 73/204.21 |
| 5,942,683 A | * | 8/1999 | Aoi et al. ..................... | 73/202 |
| 6,148,663 A | * | 11/2000 | Stahl et al. ................ | 73/118.2 |
| 6,272,920 B1 | * | 8/2001 | Tank et al. ................. | 73/118.2 |
| 6,298,720 B1 | * | 10/2001 | Mueller et al. ............ | 73/118.2 |
| 6,345,531 B1 | * | 2/2002 | Mueller et al. ............ | 73/118.2 |

\* cited by examiner

Primary Examiner—Hezron Williams
Assistant Examiner—Corey D. Mack
(74) Attorney, Agent, or Firm—Ronald E. Greigg

(57) ABSTRACT

The match with a measurement characteristic curve of a device for air flow measurement is disturbed by pulsations, soiling and poor flow behavior. An improvement in the measuring performance of the device is achieved by provisions, which are adapted to one another, for reducing these sources of trouble, according to which the flow cross section of an inlet conduit narrows in a flow direction in the inlet conduit toward a deflection conduit, and a peripheral face of a first portion of the deflection conduit is embodied in inclined fashion, and at least one outer face of a sensor carrier, together with a peripheral face, closer to an outlet conduit, of the inlet conduit, forms a flush transition.

26 Claims, 5 Drawing Sheets

DEVICE FOR MEASURING THE MASS OF A FLOWING MEDIUM

CROSS-REFERENCE TO RELATED APPLICATIONS

This application is a 35 USC 371 application of PCT/DE 00/01850 filed on Jun. 7, 2000.

BACKGROUND OF THE INVENTION

1. Field of the Invention

The invention is directed to an improved mass flow measuring device for measuring the mass of a flowing medium.

2. Description of the Prior Art

A mass flow measuring device with a measurement conduit is already known (German Patent Disclosure DE 197 35 891 A1), which conduit accommodates a measuring element that is bathed by the inflowing medium there. The flowing medium flows from an inlet conduit first into a deflection conduit, which has a larger flow cross section than the inlet conduit and has a right-angled corner, so that there is an abrupt flow transition in the form of a shoulder toward the inlet conduit. Adjoining that, the medium flows from the deflection conduit, deflected by the corner, along the peripheral face of the deflection conduit into an outlet conduit adjoining it transversely, and leaves the outlet conduit through an outlet opening so that it can mix again with the medium flowing past the device. An inlet conduit longitudinal axis and an outlet conduit longitudinal axis are inclined by a predetermined angle relative to the longitudinal axis of the line, so that the inlet conduit has a region that is shaded from a primary flow direction. The measuring element is disposed in the shaded region of the measurement conduit, to prevent soiling and resultant defects of the measuring element.

Dirt particles that enter the inlet conduit along with the flowing medium can destroy the measuring element, if the dirt particles collide with it. Especially if micromechanical components, of the kind described in German Patent Disclosure DE 43 38 891 A1, for instance, are used as measuring elements, the dirt particles can strike a relatively thin diaphragm and permanently damage it. This can lead to increased wear of the measuring element and premature failure. Dirt particles that contain oil or grease can also become deposited on the measuring element, and especially on its diaphragm; they can act as adhesion promoters for solid particles, such as dust, and can permanently soil the measuring element. The soiling interferes with the thermal coupling between the measuring element and the flowing medium, causing a shift in a measurement characteristic curve that necessarily leads to measurement errors and thus incorrect triggering of the fuel injection valves.

From German Patent Disclosure DE 196 23 334 A1, it is known that the inlet conduit of such a device has a rectangular cross section; two side faces toward the chiplike measuring element are embodied as extending obliquely, resulting in a narrowing of the inlet conduit in the flow direction of the medium in the inlet conduit. A top face of the inlet conduit extending transversely to the side faces, from which top face the measuring element protrudes, and a bottom face of the inlet conduit opposite the top face, extend plane or parallel, with a constant spacing from one another. A device equipped with this kind of inlet conduit is also known from SAE Paper 950433 (International Congress and Exposition, Detroit, Mich., Feb. 27–Mar. 2, 1995, reprinted from: Electronic Engine Controls 1995 (SP-1082)). As can be seen from the sectional view in FIG. 7, top, on page 108 of this publication, the inlet conduit and the deflection/outlet conduit are essentially formed of two parts; a part hereinafter called the bottom part, together with the measuring element includes a side face, a top face, and a bottom face of the measurement conduit. Another part has only the second side face of the measurement conduit and thus forms a cap part. The bottom part and the cap part are made from plastic by plastic injection molding. The narrowing design of the side faces of the inlet conduit results in an increasing wall thickness in the flow direction.

In an internal combustion engine, opening and closing of the injection valves of the individual cylinders cause considerable fluctuations or pulsations in the flow, the severity of which depends on the intake frequency of the individual pistons and on the engine rpm. The flow pulsations propagate from the injection valves along the intake line to the measuring element in the inlet conduit and onward from there. The effect of the pulsations is that depending on their severity, because of thermal inertia and directional insensitivity of the measuring element, the measuring element produces a measurement result that can deviate considerably from the flow speed prevailing in the inlet conduit and from the resultant calculated intake air flow rate of the engine. The inlet conduit and the deflection/outlet conduits are adapted to one another in their dimensions such that when there is a pulsating flow in the intake line, the erroneous indication provided by the measuring element as a result of the flow fluctuations is minimal. Nevertheless, at high pulsation frequencies and a significant pulsation amplitude, flow and/or acoustical processes taking place in the deflection conduit can lead to an erroneous indication of the aspirated air flow rate. This erroneous indication arises especially because when there is a pulsating flow downstream of the measuring element at the shoulder between the outlet of the inlet conduit and the corner at the first portion of the deflection conduit, a pressure wave can occur, which is reflected from the peripheral face of the deflection conduit at the corner, so that feedback interferes with a measurement signal of the measuring element.

From German Patent Disclosure DE 197 41 031 A1, a measurement device with an inlet conduit is known, in which device, by the design of two walls of the inlet conduit, an acceleration of the flow in the inlet conduit can continue to be maintained; this acceleration is known to lead to a stabilization of the flow of the medium in the inlet conduit, especially at the inlet.

However, the known devices have at least two of the following disadvantages:

- they do not offer adequate protection of the measuring element from dirt;
- a flow around the sensor carrier and poor stabilization of the flow in the inlet conduit lead to scattering of the measurement signal;
- narrowing of the inlet conduit in only one direction, or in other words two opposed side walls;
- inadequate provisions, if any, for improved pulsation performance;
- disadvantages in terms of production: the entire measuring device would have to be tilted for improved protection against dirt, with the resultant changes in the measurement stub into which the measurement device is inserted; and
- because of the increasing wall thickness of the plastic, different cooling speeds occur along with accumulations of material, which can in particular cause sunken areas on the side faces of the measurement conduit and which, in planned mass production of the device, would cause more or less severe scattering of the attainable measurement precision of the devices.

SUMMARY OF THE INVENTION

The improved flow measuring device according to the invention has the advantage over the prior art that in a simple way, the measurement performance is improved by reducing systematic and static errors, such as pulsation of the flow, by reduced soiling, and by improved flow behavior of the medium specifically.

Characteristics of claims 2–7 and 21 have the advantage improved stabilization of the flow in the measurement conduit, improved protection from dirt particles, and improvement at in the pulsation behavior are acheived.

The sealing of the sensor carrier at the bypass cap, the narrowing, the streamlined embodiment of all four peripheral faces of the inlet conduit, and the generally S-shaped embodiment of the measurement conduit all stabilize the flow in the measurement conduit.

Because of the oblique front edges of the sensor carrier and because of transverse flow components resulting from the inclination of the inlet conduit at a tangent to the respective edge of the sensor carrier, liquid and solid contaminants are carried away during operation. The shaded region prevents further accumulation of dirt particles. A suitable embodiment of an edge of the bow of the measurement housing and of a side wall of the inlet opening contribute to reflecting dirt particles away from the inlet opening.

Erroneous indications that occur when pulsation frequencies are high are reduced by the provision that a protuberance is provided in a surrounding region of the outlet opening, and a peripheral face of a first portion of the deflection conduit is embodied as inclined toward the flow direction in the measurement conduit. A fluidic connection or communication with the outer flow in the intake line, provided in the deflection conduit and taking the form of an opening, reduces any residual interference with the pressure wave that may still exist in the deflection conduit.

BRIEF DESCRIPTION OF THE DRAWINGS

Other features and advantages of the invention will be apparent from detailed description contained hereinbelow, taken with the drawings, in which.

DESCRIPTION OF THE PREFERRED EMBODIMENTS

Figure 1:
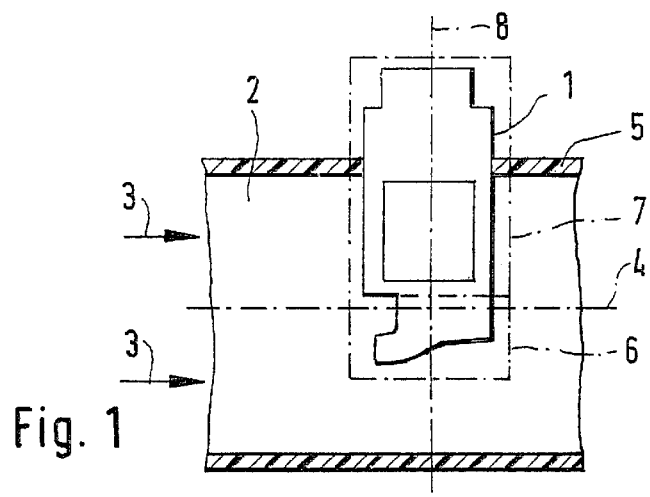
FIG. 1 shows a device according to the invention for measuring air flow rates, in the built-in state.

FIG. 1 schematically shows how a device 1 according to the invention is built into a line 2 within which the medium to be measured flows.

The device 1 for air flow rate measurement comprises a measurement housing 6, represented by a lower rectangle drawn in dashed lines, and a carrier part 7, represented by an upper rectangle drawn in dashed lines, in which the evaluation electronics are for instance accommodated. The measurement housing 6 and the carrier part 7 have a common longitudinal axis 8, which by way of example can also be the center axis. The device 1 is introduced, for instance in plug-in fashion, into a wall 5 of the line 2. The wall 5 defines a flow cross section, in the center of which a center axis 4 extends in the direction of the flowing medium, parallel to the wall 5. The direction of the flowing medium, hereinafter called the primary flow direction, is represented by corresponding arrows 3 and extends in this case from left to right.

Figure 2:
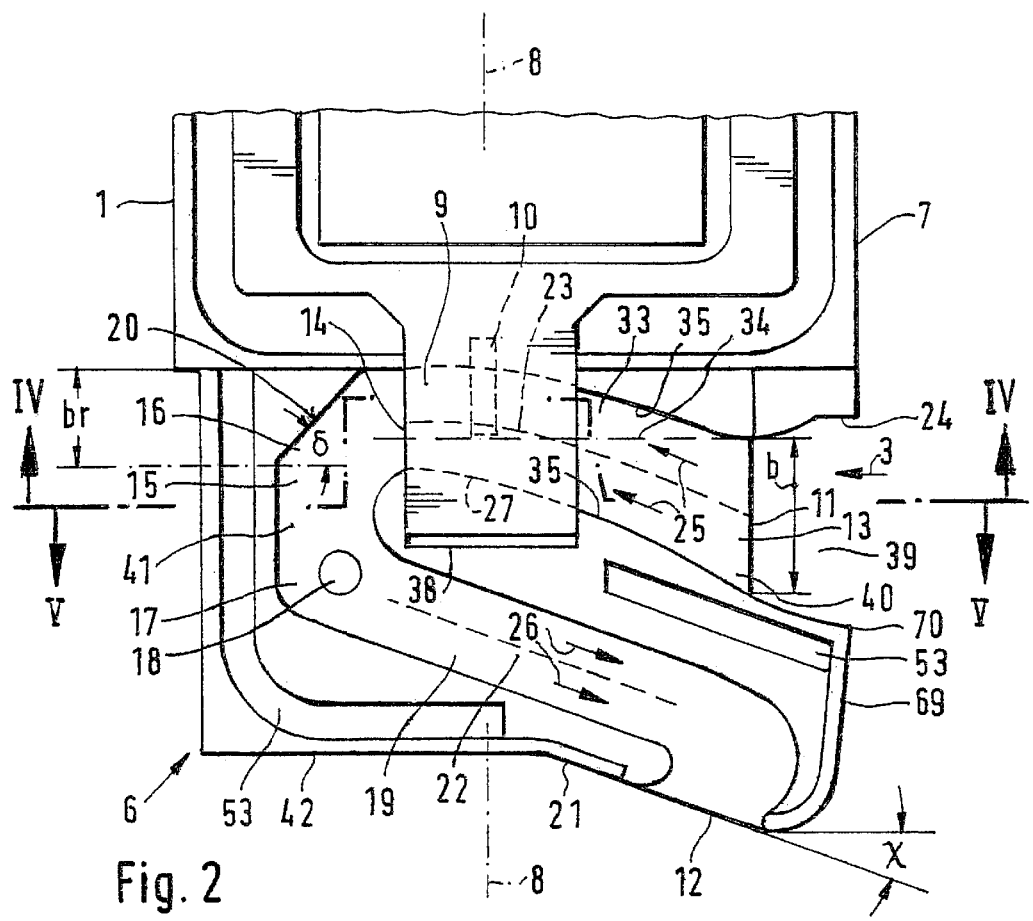
FIG. 2 shows the inlet conduit, deflection conduit and outlet conduit in the measurement housing.

FIG. 2 shows the measurement housing 6 with a measurement conduit 40 and the carrier part 7, without a cap 49 that closes the measurement conduit 40. The measurement conduit 40 is formed by a bottom part 42 and a cap 49 (FIG. 3). The primary flow direction 3 of the medium is represented by arrows. The measurement conduit comprises an inlet conduit 13, a deflection conduit 15, which in turn splits into a first part 16 and second part 17, and an outlet conduit 19. The flow directions 25, 26 in the inlet conduit 13 and outlet conduit 19 are also represented by arrows. The center line 23 of the inlet conduit is curved in this case, since the peripheral faces 35 of the inlet conduit are embodied in streamlined fashion. The center line 22 of the outlet conduit in this case is a straight line.

In the front or upstream region 39 of the measurement conduit 40 upstream of an inlet opening 11 through which the medium flows in, a flow obstacle 24 is provided, which brings about a defined flow separation that is operative in the measurement conduit. This is described in further detail in German Patent Disclosure DE 44 41 874 A1 and is meant to be part of the present disclosure.

A bow 69 of the measurement housing 6 is shaped such that solid or liquid particles are reflected away from the inlet opening 11. To that end, the bow 69 is inclined counter to the carrier part 7.

A face 34, drawn in dashed lines and extending parallel to the primary flow direction 3, together with the peripheral face of the inlet conduit toward the carrier part 7, forms a shaded or lee region 33, into which only a few if any dirt particles or liquids enter.

In the first part 16 of the deflection conduit 15, a peripheral face 20 is inclined counter to the primary flow direction 3 by an angle δ. The angle δ can be in the range from about 30–60° and ideally is about 45°. The influence of this embodiment is described in further detail in German Patent Disclosure DE 196 23 334 A1 and is meant to be part of the present disclosure. The peripheral face 20 has a depth tr (FIG. 4) and a width br extending perpendicular to it which is equivalent to at least ⅔ the width b of the inlet opening 11 of the inlet conduit 13. Perpendicular to the width br, the peripheral face 20 has a depth tr that is approximately equivalent to the depth t of the inlet conduit 13 perpendicular to its width b at the inlet opening 11. However, it is also possible to embody the peripheral face 20 with a depth tr that is somewhat less than the depth t of the inlet opening 11 of the inlet conduit 13. Adjoining the peripheral face 20, the wall of the first portion 16 extends approximately in the direction of the longitudinal axis 8.

An opening 18 that establishes a communication with a medium that bathes the device 1 is provided in the second portion 17 of the deflection conduit 15. There can also be more than one opening. The opening or openings can also be located only in the first part or in the first part 16 and second part 17 of the deflection conduit 15. The opening or openings can be located on the side walls 41 and/or can lead to a lower outer face 21 of the measurement housing 6 of the device 1 having the measurement conduit 40, in order to establish the communication with the line 2. The outlet opening 12 is located at the end of the outlet conduit 19, and its face forms an angle χ with the primary flow direction 3, through which the medium leaves the measurement conduit again. The outlet opening 12 has a larger cross section than the outlet conduit 19, and as a result the pulsation behavior is improved.

The sensor carrier 9 protrudes into the inlet conduit 13 and in this example protrudes in part into a recess 38, which is provided in the peripheral face 27 of the inlet conduit 13 closer to the outlet conduit 19. A partition 52 located on a cap 49 (FIG. 3) that closes the inlet conduit 13, deflection conduit 15 and outlet conduit 19, forms a flush transition 50 with a part of a side, toward the cap 49 and forming an outer face, of the sensor carrier 9 and engages the inside of the recess 38 in such a way that it continues the peripheral face 27 in the region of the recess 38, so that no flow flowing around the sensor carrier 9 will occur here.

The measuring element 10 is accommodated in the sensor carrier 9 and is appropriately located in the shaded region 33. The layout of a measuring element 10 of this kind is adequately known to one skilled in the art, for instance from German Patent Disclosure DE 195 24 634 A1, whose disclosure is meant to be part of the present patent application. In some regions between walls of the measurement conduit 40 and outer faces of the measurement housing 6, indentations 53 are provided in the bottom part 42 of the measurement housing; in some parts they bring about a constant wall thickness, and in others a reduction in the wall thickness, of the peripheral faces of the measurement conduit 40.

Figure 3A:
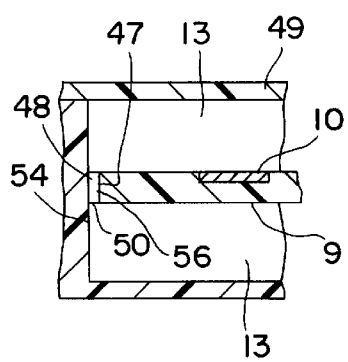
FIGS. 3a, 3b and 3c show a flush transition of the sensor carrier and the measurement conduit.
Figure 3B:
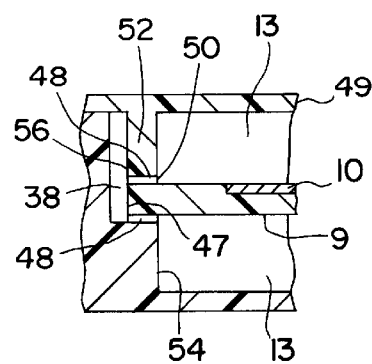
Figure 3C:
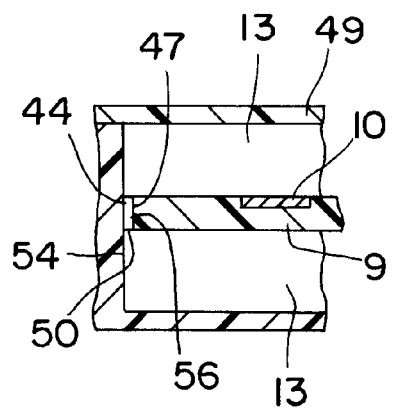

FIG. 3 shows two examples of how a flush transition 50 between an outer face of the sensor carrier 9 and a peripheral face 54 of the inlet conduit 13 is achieved. The drawing shows a section taken along the longitudinal axis 8. In the first example, FIG. 3a), there is no recess in the peripheral face 54 of the inlet conduit 13. Between a face end 47 of the sensor carrier 9 and a peripheral face 54 of the inlet conduit 13 closer to the outlet conduit 19, there is a sealing means 48, which fills the gap 56 that may be present because of tolerances and thus forms the flush transition 50, so that no flow underneath takes place there. Alternatively, the sealing means 48 can also be applied around the sensor carrier 9 at the level of the face end 47, or in other words around the gap 56 that is present because of tolerances. The gap 56 is thus closed and forms the flush transition 50 in such a way that no flow underneath occurs there.

In FIG. 3b), a recess 38 is present in the peripheral face 54 of the inlet conduit 13 closer to the outlet conduit 19, and the sensor carrier 9 protrudes with its face end 47 into this recess. The partition 52, located on the cap 49 that closes the inlet conduit 13, deflection conduit 15 and outlet conduit 19, engages the inside of the recess 38 in such a way that it continues the streamlined peripheral face 35 of the inlet conduit 13 in the region 27 of the recess 38. Located between a face end of the partition 52 and a side of the sensor carrier 9 that forms an outer face toward the cap 49, there is a sealing means 48, which fills the gap 56 that might be present because of tolerances and thus forms the flush transition 50. Alternatively, the sealing means 48 can also be applied around the sensor carrier 9 at the level of the peripheral face 54, or in other words around the gap 56 that exists because of tolerances. The gap 56 is thus closed and forms the flush transition 50 in such a way that no flow underneath occurs there. A sealing means 48 is also, but not necessarily, located between the sensor carrier 9 and a peripheral face, farther away from the measuring element 10, in the recess 38 of the inlet conduit 13.

FIG. 3a, at 44 shows an instance where the sealing has been carried out by means of welding, such as by ultrasound or laser, wherein the sensor carrier 9 has been joined to the opposite side of the inlet conduit.

Figure 4:
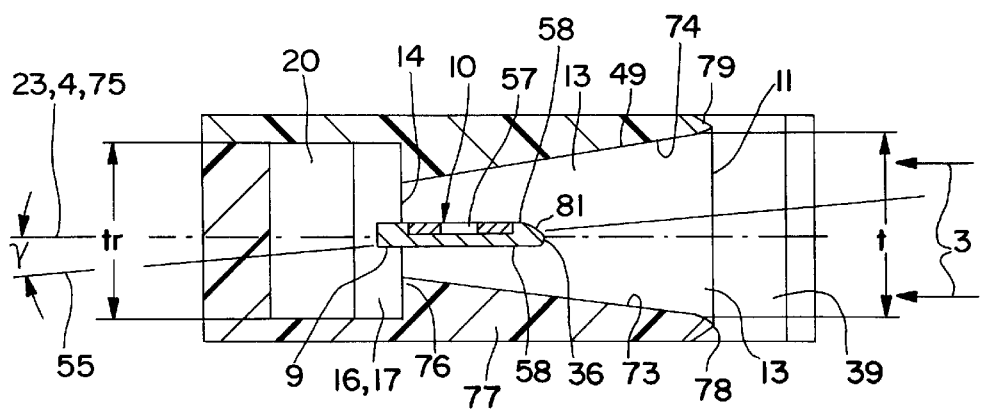
FIGS. 4, 4a and 5 each show a sectional view of FIG. 1.

FIG. 4 shows a section taken along the line IV—IV in FIG. 2, including the cap 49 that extends through the shaded region 33.

Figure 4A:
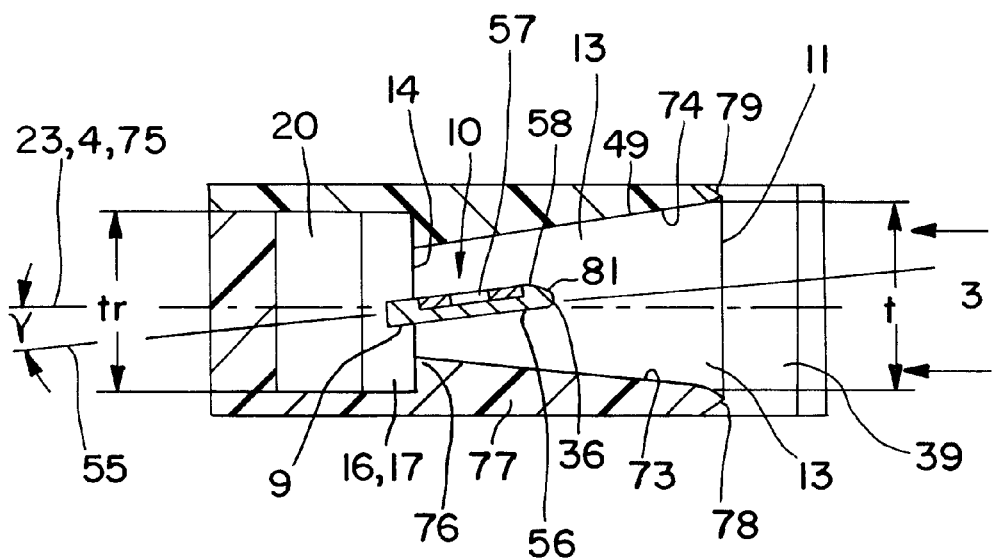

The inlet conduit 13 of the device 1 has a blocklike shape and extends along an inlet conduit center line 23 extending centrally in the inlet conduit 13 from an inlet opening 11, which for example has a rectangular cross section, to an outlet opening 14, which for instance also has a rectangular cross section. The device 1 is built into the line 2 preferably in such a way that a perpendicular projection of the inlet conduit center line 23 in the direction of the center line 4 onto a plane that is perpendicular to the longitudinal axis 8 extends parallel to the center line 4. However, it is also possible, as indicated in FIG. 4a to install the device 1 in an installed position rotated about the longitudinal axis 8, so that the line 55, which represents the axis of the device 1, and the center line 4 form an angle γ of a few degrees.

A receptacle 57 for the measuring element 10 is recessed out of the sensor carrier 9 on one side. The measuring element 10 and the two side faces 58, extending approximately parallel to the center line 23 of the inlet conduit, of the sensor carrier 9 are thus bathed by the medium.

The side faces 73, 74 of the measurement conduit 40 extend obliquely to a plane 75 defined by the center line 23 of the measuring element and by the longitudinal axis 8, and with it they form an acute angle, so that viewed in the primary flow direction 3, the inlet conduit 13 narrows axially and then discharges with its smallest cross section at the outlet opening 14 into a first portion 16 of the deflection conduit 15.

The narrowing has the effect that in the region of the measuring element 10, a parallel flow that is as unimpeded and as uniform as possible can prevail. To avoid flow separations in the region of the inlet opening 11, the inlet opening 11 of the inlet conduit 13 has a rounded edge 78, shown in FIG. 5.

The measuring element 10 is disposed in the receptacle 57 downstream at the narrowest point of the inlet conduit 13 or upstream of the outlet opening 14 in the inlet conduit 13.

The deflection conduit 15, put together from the first portion 16 and second portion 17, preferably has a rectangular cross section, which is approximately equivalent to the cross-sectional area of the inlet opening 11 of the inlet conduit 13, so that the flow cross section abruptly increases at a shoulder 76 at the outlet opening 14 between the inlet conduit 13 and the deflection conduit 15.

Figure 5:
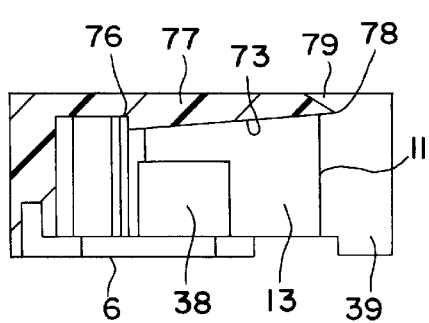

FIG. 5 shows a section taken along the line V—V in FIG. 2, but without a sensor carrier 9, and with a front region 39 that is located upstream of the inlet opening 11. A side wall 77 of the inlet conduit 13 has an edge 78 in the front region 39. This edge is chamfered in such a way that oncoming particles, such as dirt or liquids, are reflected away from the inlet opening 11. The narrowing of the inlet conduit 13 by the side face 73 can also be seen. The opposed side face to the side face 73 is formed by the cap 49 (FIG. 3). The recess 38 is located in the peripheral face of the inlet conduit 13 that is closer to the outlet conduit 19. The shoulder 76 has a height of 1 mm, for example, and could be reduced, compared to the precursor model of the device 1, by narrowing all the peripheral faces of the inlet conduit 13, in order to avoid, greater wall thicknesses and the attendant production problems.

Figure 6:
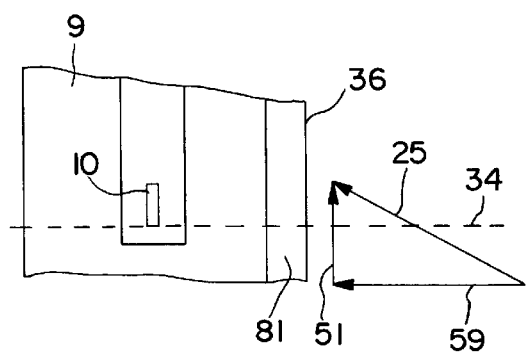
FIG. 6 schematically shows the flow conditions on the upstream face end of the sensor carrier.

FIG. 6 shows a schematic illustration of the flow conditions at an upstream face end 81 of the sensor carrier 9, which is beveled there by at least one bladelike transverse side 81, with the flow components 51, which is located in the oblique face 81, and 59 of the flow direction 25 in the inlet conduit 13. The transverse flow component 51 exerts a force that is oriented upward, in terms of FIG. 6, on dirt particles that adhere to the oblique face 81. This effect is familiar to one skilled in the art from German Patent Disclosure DE 197 35 891 A1 and is meant to be part of this present disclosure.

Figure 7:
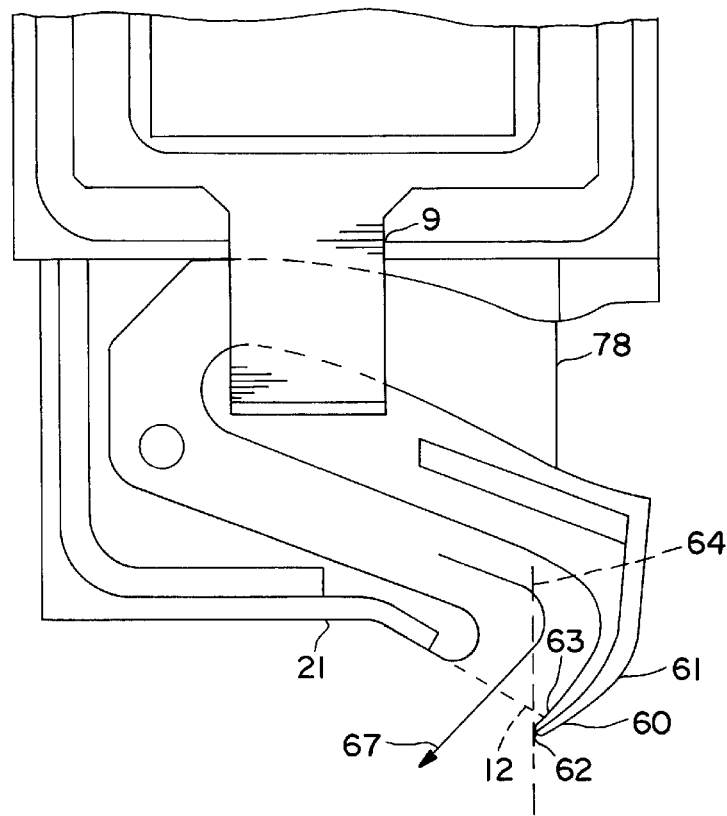
FIGS. 7 and 8 show further versions of the device of the invention.
Figure 8:
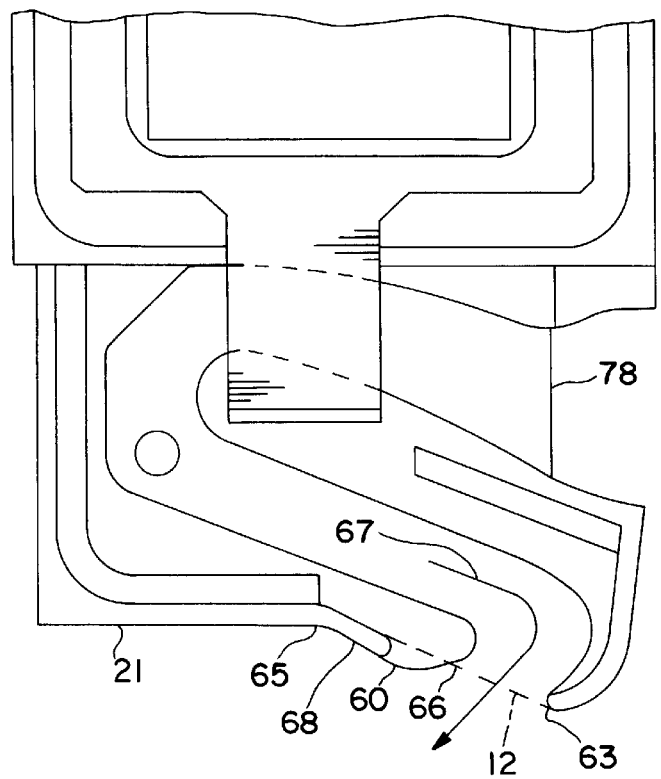

FIGS. 7 and 8 show further exemplary embodiments of the device 1 of the invention. Elements already described are provided with the same reference numerals. A tear-off edge 62 in FIG. 7 can be sharp-edged or can have a very small radius of curvature. In both cases, a protuberance 60 protrudes past a respective upstream end 63, in terms of the primary flow direction 3, of the outlet opening 12. In other words, a plane 64 extending perpendicular to the primary flow direction 3 of the line 2 and touching the tear-off edge intersects the outlet opening 12. The protuberance 60 preferably has a substantially triangular cross-sectional contour; one corner of the triangular cross-sectional contour forms the tear-off edge 62, and a further corner of the triangular cross-sectional contour coincides with the upstream end 63 of the outlet opening 12, in terms of the primary flow direction 3.

In FIG. 8, a further exemplary embodiment of the device 1 of the invention is shown, in which the protuberance 60 is disposed in a surrounding region 68 of the outlet opening 12 remote from the primary flow direction 3. The protuberance 60 here is shaped in undulating fashion and is rounded in an end region 66 toward the primary flow direction 3. The protuberance 60 is curved steadily and in the downstream region 65 in terms of the primary flow direction 3, it merges with a plane 21, without forming any edges. When the protuberance is provided upstream of the outlet opening, the pulsation error is shifted in the direction of an underindication, and the pulsation error occurring as a systematic measurement error is compensated for. Conversely, if the protuberance is disposed downstream of the outlet opening 12 in the primary flow direction 3, the pulsation error is shifted in the direction of an excess indication. The result in the region of the protuberance is a relatively slight turbulence in the flow, and the protuberance presents a relatively slight flow resistance to the primary flow in the line 2. A backpressure is built up in the end region 66 of the protuberance 60 and makes the flow through the measurement conduit 40 more difficult. In the case of a reverse flow in the line 2 counter to the primary flow direction 3, this backpressure counteracts a flow through the measurement conduit 40 in the reverse flow direction.

Figure 9A:
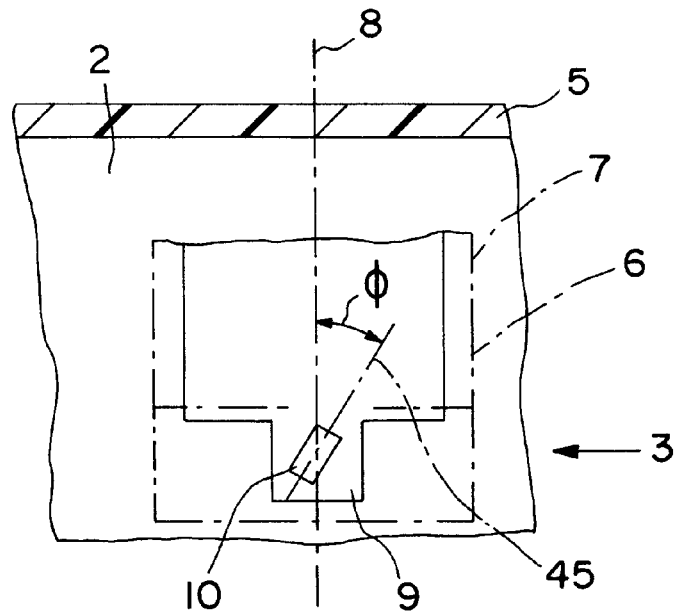
FIG. 9 shows various arrangements of the sensor carrier and measuring element.

FIG. 9 shows various arrangements of the sensor carrier 9 and measuring element 10 inside the measurement housing 6 that is drawn with dashed lines. In FIG. 9a), the sensor carrier 9 is disposed as in FIG. 2, for instance: A longitudinal axis 8 of the sensor carrier 9 is perpendicular to the primary flow direction 3, and a longitudinal axis 45 of the measuring element 10 extends parallel to the longitudinal axis 8. In FIG. 9a), however, the measuring element 10 is disposed with its longitudinal axis 45 inclined by an angle φ in the sensor carrier 9 compared to the longitudinal axis 8.

Figure 9B:
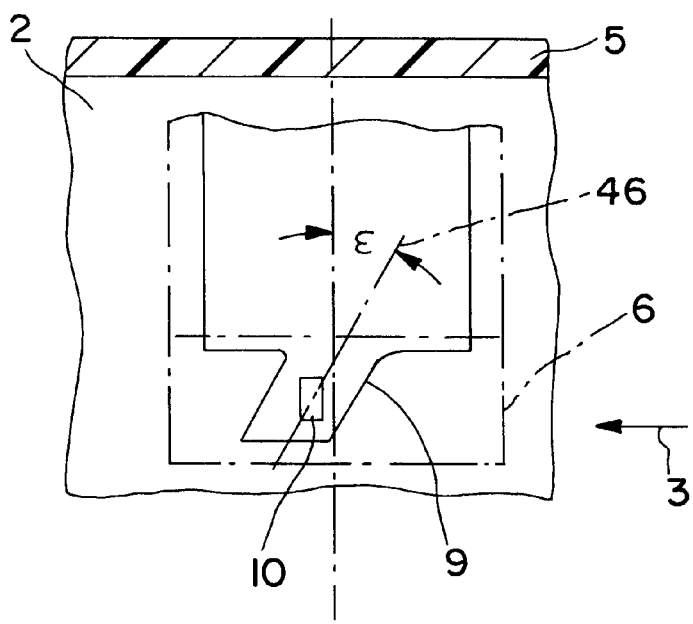

In FIG. 9b), the longitudinal axis 46 of the sensor carrier 9 is inclined by an angle E from the longitudinal axis 8. A longitudinal axis of the measuring element 10 extends parallel to the longitudinal axis 8. With these arrangements, the behavior in terms of the oncoming flow and the flow around the measuring element 10 and the sensor carrier 9 can be improved still further.

The foregoing relates to preferred exemplary embodiments of the invention, it being understood that other variants and embodiments thereof are possible within the spirit and scope of the invention, the latter being defined by the appended claims.

We claim:

1. In a device (1) for measuring the mass of a medium flowing in a line (2) along a primary flow direction (3), in particular the air flow rate for an internal combustion engine, having a measurement housing (6) provided in the line (2), which housing communicates with a carrier part, whose common longitudinal axis (8) extends perpendicular to the primary flow direction (3), having a measurement conduit (40) in the measurement housing (6), which conduit extends from an inlet opening (11) and an inlet conduit (13), which is adjoined by a first portion (16) of a deflection conduit (15), within which portion the medium flows from the inlet conduit (13) and is deflected from a peripheral face (20) of the first portion (16) into a second portion (17) of the deflection conduit (15), and an outlet conduit (19) to an outlet opening (12) that discharges into the line (2) at an outer face (21) of the measurement housing (6), wherein at least one part of the center line (23) of the inlet conduit and at least one part of the center line (22) of the outlet conduit extends inclined toward the primary flow direction (3), and having a measuring element (10) bathed by the flowing medium located in the measurement conduit (40) and disposed on a sensor carrier (9), the improvement wherein the flow cross section of the inlet conduit (13) narrows in the primary flow direction (3) toward the deflection conduit (15), and the peripheral face (20) of the first portion (16) of the deflection conduit (15) is located in the projection of an outlet opening (14) of the inlet conduit (13) in the flow direction (25) in the inlet conduit (13) onto the opposite wall of the first portion (16) and is embodied as inclined counter to the flow direction (25) in the inlet conduit (13), and the sensor carrier extends from a first side of the inlet conduit (13) which is remote from the outlet conduit (19) to a second side (27) of the inlet conduit which is closer to the outlet conduit and together with second side (27) forms a flush transition (50), so that no flow around the sensor carrier (9) occurs there.

2. The device of claim 1, wherein the peripheral face (20) of the first portion (16) of the deflection conduit (15) is embodied as inclined, counter to a flow direction (25) in the inlet conduit (13), by an angle 67 enclosed by the peripheral face (20) and the primary flow direction (3).

3. The device of claim 1, wherein the first portion (16) of the deflection conduit (15) is adjoined in a flow direction (25) by the second portion (17), and in the first portion (16) or in the second portion (17) at least one opening (18) is provided, which establishes a communication with the medium flowing around the device (1).

4. The device of claim 1, wherein the sensor carrier (9) is mounted within the inlet conduit (13) at a small angle such that the medium, as it flows along the primary flow direction (3), does not directly impinge upon the measuring element (10).

5. In a device (1) for measuring the mass of a medium flowing in a line (2) along a primary flow direction (3), a measurement housing (6) provided in the line (2), the measurement housing (6) having a measurement conduit (40) which includes an inlet conduit (13) which extends from an inlet opening (11) to a deflection conduit (15), and through which a portion of the medium flows, and an outlet conduit (19) that connects to the deflection conduit and has an outlet opening (12) that discharges said portion of flowing medium back into the line (2) at an outer face (21) of the measurement housing (6), a measuring element (10) located in the inlet conduit (13) so as to be bathed by said portion of flowing medium in the inlet conduit (13), and disposed on a sensor carrier (9), wherein the sensor carrier (9) extends into the inlet conduit (13) from a first side thereof which is the side of the inlet conduit which is spaced farthest from the outer face (21) of the measurement housing (6), and an end of the sensor carrier (9) extends to a second side (27) of the inlet conduit which is opposite from the first side of the inlet conduit (13), which second side of the inlet conduit (13) is closer to the outer face (21) of the measurement housing (6) than is said first side, and said end of the sensor carrier (9) which extends to the second side of the inlet conduit (13), together with this second side of the inlet conduit (13) forms a flush transition (50), so that no fluid is allowed to flow around said end of the sensor carrier (9).

6. The device of claim 5, wherein one face end (47) of the sensor carrier (9), as an outer face, terminates flush with the second side (27) of the inlet conduit (13), so that no flow around the sensor carrier (9) occurs there.

7. The device of claim 6, wherein a sealing means (48) is applied around the sensor carrier (9) at the level of the face end (47) of the sensor carrier (9), or between the face end (47) of the sensor carrier (9) and the second side (27) of the inlet conduit (13), or around the partition (52) at the level of a peripheral face (54) of the inlet conduit (13), or between the face end of the partition (52) and the part, opposite the face end of the partition (52), of the sensor carrier (9), to seal any gap (56) existing at these locations.

8. The device of claim 6, wherein the face end (47) of the sensor carrier (9), as an outer face, is welded, for instance by a laser or ultrasound, to the second side (27) of the inlet conduit (13), so that no flow around the sensor carrier (9) occurs there.

9. The device of claim 5, wherein a recess (38) is provided in the second side (27) of the inlet conduit (13), into which recess the sensor carrier (9) protrudes partway, and a partition (52) located on a cap (49) that closes the inlet conduit (13), deflection conduit (15) and outlet conduit (19) forms a flush transition (50) with one part of a side of the sensor carrier (9), oriented toward the cap (49) and forming an outer face, and engages the inside of the recess (3) in such a way that it continues the second side (27) in the direction of the recess (38), so that no flow around the sensor carrier (9) occurs there.

10. The device of claim 5, wherein one or more of the surfaces (35) surrounding at least one of the inlet conduit (13), the deflection conduit (15) and the outlet conduit (19) are embodied in streamlined fashion.

11. The device of claim 5, wherein a first portion (16) of the deflection conduit (15) is embodied such that the flow cross section of the measurement conduit (40) abruptly increases downstream of an outlet opening (14) between the inlet conduit (13) and the deflection conduit (15) and forms a shoulder (76).

12. The device of claim 5, wherein a shaded region (33) is defined by the first side (35) of the inlet conduit (13) and an imaginary bottom face (34) on which the longitudinal axis (8) of the measurement housing (6) stands vertically and is of tangent to the one or more points of the side (35) of the inlet conduit (13) extending in the inlet conduit (13) or in a region upstream of it parallel to the primary flow direction (3), which has the greatest spacing from the second side (27), and the measuring element (10) is located in the shaded region (33).

13. The device of claim 5, wherein a center line (4) of the line (2) that extends parallel to the primary flow direction (3) is tangent in the inlet conduit (13) or a region upstream of it to one or more points of the first side (35) of the inlet conduit.

14. The device of claim 5, wherein an upstream face end (36) and a transverse side (81) of the sensor carrier (9) are shaped aerodynamically.

15. The device of claim 14, wherein the upstream transverse side (81) of the sensor carrier (9) is oriented such that the medium on the upstream transverse side (81) meets the transverse side (81) with a transverse flow component (51) which is located in the plane of the aerodynamically shaped transverse side (81) of the sensor carrier (9).

16. The device of claim 5, wherein the outer face (21), having the outlet opening (12), of the measurement housing (7) is inclined by an angle $\chi$ relative to the primary flow direction (3) of the medium.

17. The device of claim 5, wherein the outlet opening (12) has a cross-sectional enlargement compared with the outlet conduit (19).

18. The device of claim 5, wherein at least one protuberance (60) is disposed on the outer face (21) of the measurement housing (6) that has the outlet opening (12), in a surrounding region (61) of the outlet opening (12) oriented at least toward the primary flow direction (3), and remote from the primary flow direction (33.

19. The device of claim 18, wherein the protuberance (60) is disposed in the surrounding region (61) of the outlet opening (12) oriented toward the primary flow direction (3) and has a tear-off edge (62).

20. The device of claim 19, wherein a plane (64) that touches the tear-off edge (62) and extends perpendicular to the primary flow direction (3) of the line (2) intersects the outlet opening (12).

21. The device of claim 5, wherein at least one of a longitudinal axis (46) of the sensor carrier (9) and a longitudinal axis (45) of the measuring element (10) extends inclined by an angle relative to a longitudinal axis (8) of the measurement housing (6).

22. The device of claim 5, wherein the inlet conduit (13) has a rectangular cross section.

23. The device of claim 5, wherein the region of the deflection conduit (15) and of the outlet conduit (19) is embodied as S-shaped.

24. The device of claim 5, wherein one edge (70) of a bow (69) of the measurement housing (6) is embodied as slightly elevated toward a carrier part (7), so that oncoming particles are reflected away from the inlet opening (11).

25. The device of claim 5, wherein a side wall (77) of the inlet opening (11) is chamfered in such a way that it forms a beveled face (79), which ends in an edge (78), and the beveled face (79) is embodied on an outer face of the measurement housing (6), so that oncoming particles are reflected away from the inlet opening (11).

26. The device of claim 5, wherein the sensor carrier (9) is mounted within the inlet conduit (13) at a small angle such that the medium, as it flows along the primary flow direction (3), does not directly impinge upon the measuring element (10).

* * * * *